J. W. & C. M. COLE.
Centrifugal Honey Extractor.

No. 224,654.              Patented Feb. 17, 1880.

WITNESSES:
W. W. Hollingsworth
Amos W. Hart

INVENTOR:
J. W. Cole
C. M. Cole
BY
ATTORNEYS.

UNITED STATES PATENT OFFICE.

JOSEPH W. COLE AND COLUMBUS M. COLE, OF WARREN COUNTY, KY.

CENTRIFUGAL HONEY-EXTRACTOR.

SPECIFICATION forming part of Letters Patent No. 224,654, dated February 17, 1880.

Application filed August 20, 1879.

*To all whom it may concern:*

Be it known that we, JOSEPH W. COLE and COLUMBUS M. COLE, of Warren county, Kentucky, (P. O., Woodbury, Butler county, Kentucky,) have invented a new and Improved Centrifugal Honey-Extractor; and we do hereby declare that the following is a full, clear, and exact description of the same.

Our invention relates to an improvement in the class of machines for extracting honey from the comb by the effect of centrifugal action.

In the construction of our machine we have aimed at the greatest simplicity and economy, also provided for the convenient insertion and removal of the comb, for supporting comb of any size without the aid of a supplemental device, and for reception of the extracted honey into cups or buckets, which are made detachable for the purpose of enabling them to be removed when filled and replaced by empty ones.

Figure 1:
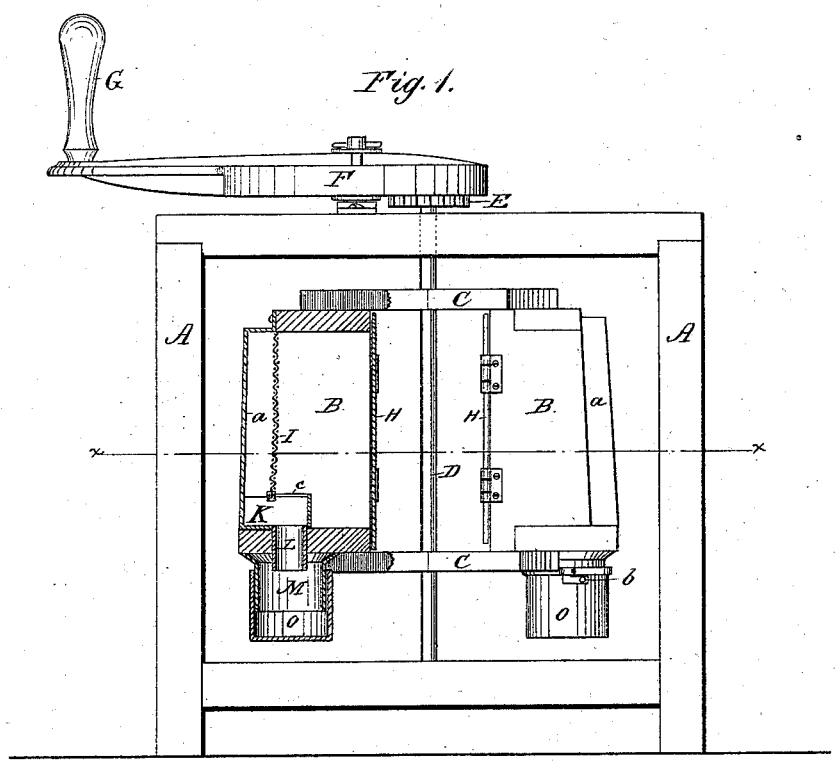
Figure 2:
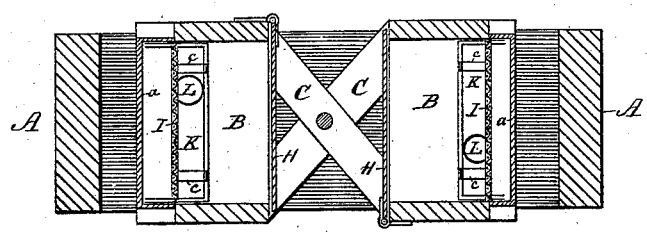

In the accompanying drawings, forming part of this specification, Figure 1 is mainly a side view of our machine, part being in section to show the interior construction. Fig. 2 is a cross-section on the line $x\,x$, Fig. 1.

The frame A of the machine is rectangular and set vertical. The chambers or boxes B, in which the comb is placed for the purpose of extracting the honey, are supported vertically by horizontal arms C, radiating from the vertical axis D. Rotary motion is imparted to the latter by means of a pinion, E, and an internally-toothed wheel, F, which is journaled on the top of frame A and provided with a handle, G. Each box B is provided on its inner side with a hinged door, H, which opens toward the axis D. A perforated screen, I, is placed near and parallel to the metallic back $a$ of the box, and directly over a trough, K, which has a discharge-tube, L. The under side of each box B is provided with a circular flange, M, to which the buckets or honey-receptacles O are attached by means of a bayonet-joint, $b$.

To extract honey from comb the cap is removed and the comb-frames placed in contact with the sieve I, being supported above the troughs K by bars $c$, extending transversely across the latter. The doors H are then closed and the boxes B rotated by gear F, thus causing the honey to leave the cells by the effect of centrifugal action. The honey thus extracted flows down the metallic backs of the boxes B into troughs K, from which it escapes by tubes L into the receptacles O. When the latter have become filled with the extracted honey they are detached and discharged of their contents, and again attached to the flanges M to receive the honey discharged from another comb.

We do not claim revolving boxes supported upon transverse bars and provided with perforated screens and operated by crank and gear for use in extracting honey from comb by centrifugal action, since we are well aware such apparatus is not new.

What we claim is—

1. In a centrifugal honey-extractor, the combination of the rectangular frame A, internally-toothed gear F, pinion E, vertical shaft D, the two oppositely-placed boxes B, having troughs K secured between radial arms C, the perforated screen I, and detachable honey-receptacles O, all as shown and described.

2. In a centrifugal honey-extractor, the combination, with the revolving extracting-box B, having trough K, the tube L, and the fixed flange M, of the detachable honey-receptacle O, as shown and described.

JOSEPH WARREN COLE.
COLUMBUS MARIAN COLE.

Witnesses:
JOSEPH T. GALLOWAY,
J. T. HUDNALL.